Sept. 17, 1946.  F. W. GUIBERT ET AL  2,407,698
FLUID PRESSURE DEVICE
Filed May 8, 1944
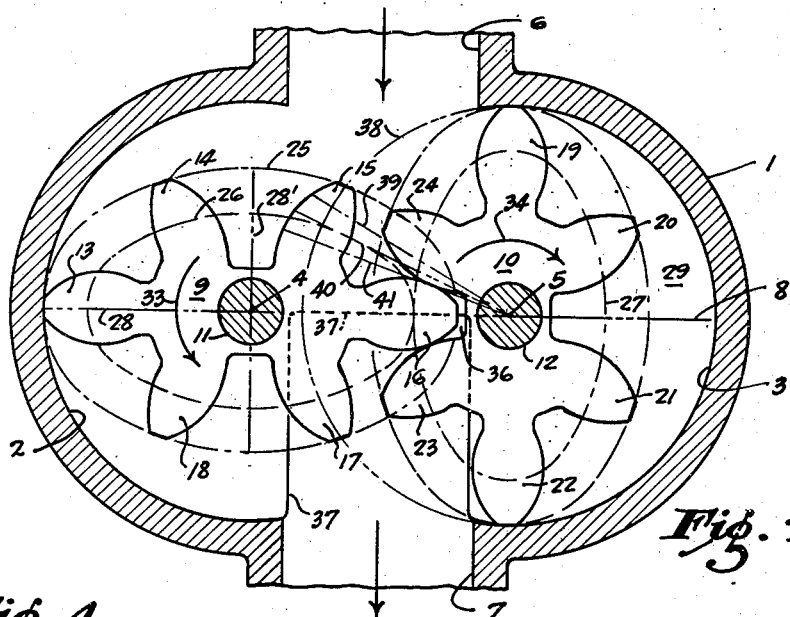
Fig. 1
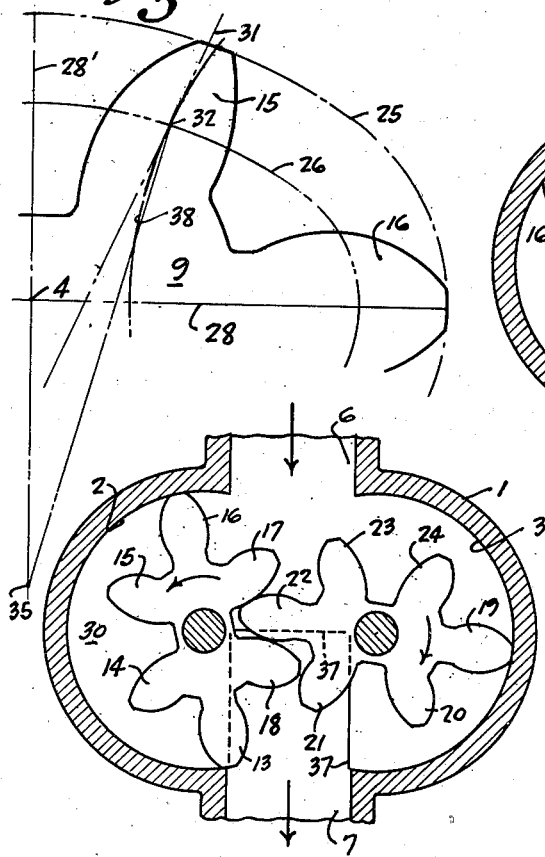
Fig. 4
Fig. 2
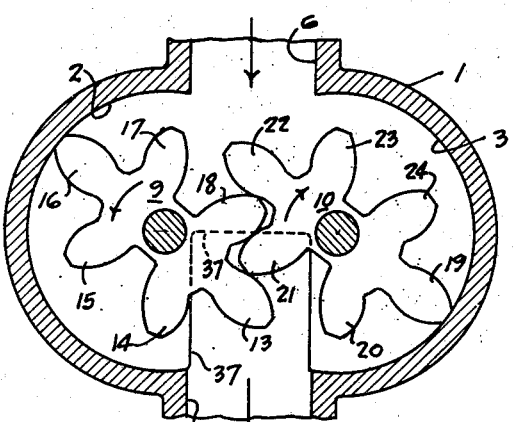
Fig. 3
INVENTORS
Francis W. Guibert
Frederic B. Fuller
BY John Flam
ATTORNEY Patented Sept. 17, 1946

2,407,698

UNITED STATES PATENT OFFICE 2,407,698

FLUID PRESSURE DEVICE

Francis W. Guibert, Beverly Hills, and Frederic B. Fuller, Whittier, Calif.; said Fuller assignor to said Guibert Application May 8, 1944, Serial No. 534,578

5 Claims. (Cl. 121—70)

1

This invention relates to a device for metering fluids, and more particularly to a device of that character provided with a pair of intermeshing rotors.

The rotors of such meters are actuated by fluid pressure. As they rotate, the rotors pass uniform volumes of the fluid from the inlet side to the outlet side of the meter. Accordingly, measurement of the fluid passing through the meter may be accomplished by recording the integrated angular motion of the rotors. This general type of fluid measurement is well known.

The volume of fluid discharged per unit of angular movement is a function of the form of the rotors. It is one of the objects of this invention to make it possible to increase the volume per unit of angular motion by providing a novel configuration for the rotors.

It is another object of this invention to provide fluid meter rotors that have interengaging teeth of such form that there is no appreciable hazard of breaking or weakening of the teeth through wear.

It is still another object of this invention to make it possible to pass liquid through the meter, although the liquid may carry sand, or other gritty matter, without material injury to the meter.

This invention possesses many other advantages, and has other objects which may be made more clearly apparent from a consideration of one embodiment of the invention. For this purpose there is shown a form in the drawing accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawing:

Figure 1 is a diagrammatic, sectional view of a meter incorporating the invention;

Figs. 2 and 3 are views similar to Fig. 1, on a slightly reduced scale, illustrating the rotors of the meter in successively different positions; and Fig. 4 is a fragmentary diagrammatic view of a portion of a rotor.

In the present instance, the fluid meter is arranged to pass a liquid medium, such as water or gasoline, through a meter casing 1. This meter casing is provided with internal cylindrical surfaces 2 and 3 that have parallel spaced axes 4 and 5. An inlet opening 6 and an outlet opening 7 are provided, respectively, on opposite sides

2 of the plane 8 that passes through the axes 4 and 5.

Mounted for rotation about axes 4 and 5 are the intermeshing rotors 9 and 10. Shafts 11 and 12 are respectively integrally formed with the rotors 9 and 10, and are appropriately mounted for rotation by the aid of the end walls of the casing 1. Rotation of the rotors by the fluid pressure exerted upon them in casing 1 is utilized for indication of the volume of fluid passing through the meter, as by the aid of a register connected to one of the shafts 11 or 12.

Each of the rotors 9 and 10 is provided with six substantially uniformly spaced teeth 13 to 18 inclusive, and 19 to 24 inclusive. The teeth 13 to 18 inclusive on rotor 9 are arranged to intermesh with teeth 19 to 24 inclusive on rotor 10. These teeth have generally the appearance of gear teeth.

Since both rotors 9 and 10 are identical, only one need be described in detail.

An envelope curve 25 is illustrated as enveloping the ends of the teeth 13 to 18 inclusive on rotor 9. This envelope curve has somewhat the form of an ellipse. A pitch line curve 26 for rotor 9 is arranged to be tangential at all times with the corresponding pitch line curve 27 of rotor 10. The teeth intermesh in such manner that the longer axis of symmetry of one rotor comes into alignment with the shorter axis of symmetry of the other rotor, as in Fig. 1. Pitch line curve 26 is, of course, located inside the envelope curve 25, and it is spaced from the curve 25 by a uniform distance corresponding to the addendum of the teeth.

The rotor 9 has an axis of symmetry 28, and another axis of symmetry 28', which are mutually perpendicular, and which intersect at the center of rotation 4. The axis of symmetry 28 is longer than the axis of symmetry 28'; and preferably, the ratio of the lengths of the two axes is not greater than two. The longer axis 28 passes through the centers of the end teeth 13 and 16. The shorter axis 28' passes centrally between the teeth 14, 15 and 17, 18.

The end teeth 13 and 16 are arranged to cooperate with cylindrical surfaces 2 for defining the volume of measuring chambers, as hereinafter described. Furthermore, the rotors will rotate as indicated by arrows 33 and 34 of Fig. 1, due to the exertion of fluid pressure on the sides of the teeth exposed in the inlet side of the casing 1.

Due to the fact that the relatively few teeth permit the use of large addenda, the amount of liquid or fluid passing through the casing 1 per unit of annular motion of the rotors is quite large; and, furthermore, the teeth are sturdy and can withstand the stresses that may be encountered in operation.

In the position of Fig. 1 where the longer axis of symmetry 28 of rotor 9 is in alignment with the shorter axis of symmetry of rotor 10, liquid or fluid fills the space 29 between the right-hand side of the rotor 10 and the cylindrical surface 3. Upon further rotation, the fluid in space 29 is passed into the outlet 7, as illustrated in the succeeding position of Fig. 2.

In Fig. 2 the metering space 30 is illustrated which has just been sealed by the entry of tooth 16 into operative relation with the cylindrical surface 2. The fluid in space 30 is about to be discharged into the outlet 7 upon a slight further rotation of the rotors. Such a discharge is occurring in the succeeding position of Fig. 3, since tooth 13 has left surface 2.

In order that the teeth may mesh properly, a further condition must be met. This is illustrated in Figs. 1 and 4. If an arc 38 having its center at axis 5 of rotor 10 be drawn when the rotors 9 and 10 are in the position illustrated in Fig. 1, this arc may be so chosen that it passes substantially through the center of the teeth 15 and 17. The radius of this arc 38 is approximately that of the cylindrical surface 3.

Thus, as shown most clearly in Fig. 1, the arc 38 bisects those portions of the radial lines 39, 40, and 41 which extend from one side to the other of the tooth 15. This is true for all of the radial lines, such as 39, 40, and 41, which do not depart far from the line 26. The limiting positions of these radial lines are substantially represented by lines 39 and 41.

A complementary condition is illustrated in Fig. 4. This condition may now be discussed.

Tooth 15 of rotor 9 is shown as having a line 31 corresponding approximately to the tangent to the arc 38 at the intersection 32 of the arc 38 with the pitch line 26. This tangent line 31 does not pass through that center of curvature 35 of pitch line 26 which corresponds to the pitch line adjacent the point 32; nor does it pass through the center of rotation 4. Instead, it assumes an intermediate position somewhat nearer to the center 4 than to the center of curvature 35.

These conditions ensure that those four teeth 14, 15, 17 and 18 which do not lie on the longer axis of symmetry 28 may properly mesh with the teeth of the other rotor.

The depth of the teeth below the pitch lines 26 and 27 is greater than the height of the teeth above the pitch lines. In other words, there is purposely a considerable clearance between the teeth and the corresponding meshing tooth, defining a narrow clearance space, such as 36 (Fig. 1) between tooth 16 and the space between teeth 23 and 24. In this space may collect any foreign matter, such as sand or grit, that may be carried into the meter housing; and, therein, such material is innocuous, and cannot cause undue wear between the contacting rotor surfaces.

The end walls of the housing 1 are each provided with a shallow recess or sump that communicates with such spaces as 36 as the teeth go into meshing position, and that is also in communication with the outlet 7. The line 37 defines the boundaries of the sump on one of the walls. The upper boundary does not extend above the plane 8 passing through the axes 4 and 5. Thus, as the teeth go in and out of mesh, the sand or other foreign matter accumulating in the clearance spaces 36 is pressed out into the outlet 7.

The mode of operation of the meter is readily understood from the foregoing. Fluid entering the inlet 6 produces a preponderance of pressure, such as to cause rotation of the rotors in the direction of arrows 33 and 34. In this process of rotation, the shafts 11 and 12 angularly advance; and this angular advance may be utilized to operate a recording or indicating mechanism in a well understood manner.

The teeth being few and large, their addenda are large, and therefore the metering spaces 29 and 30 (Figs. 1 and 2) are much greater than if smaller teeth were used. Furthermore, the teeth are sturdy, and it is relatively easy to form the teeth in such a way that they properly mesh one with another to maintain the pitch line of the rotors in continued tangential relation.

The inventors claim:

1. A toothed rotor structure for a fluid pressure device, having the following characteristics: two mutually perpendicular axes of symmetry intersecting at the center of rotation; there being six substantially uniformly spaced teeth on the rotor; there being a pitch line uniformly spaced from the ends of the teeth; the spaces between the teeth as measured along the pitch line having substantially the same width as the teeth; the curve enveloping the ends of the teeth being such that one axis of symmetry measured at the intersections with said curve is longer than the other axis of symmetry; the ratio of the lengths of the axes having a value with an upper limit of substantially two; the longer axis passing through the centers of two of the teeth; and the shorter axis passing through the center of the spaces between other teeth.

2. A toothed rotor structure for a fluid pressure device, having the following characteristics: two mutually perpendicular axes of symmetry intersecting at the center of rotation; there being six substantially uniformly spaced teeth on the rotor; the curve enveloping the ends of the teeth being such that one axis of symmetry measured at the intersections with said curve is longer than the other axis of symmetry, the ratio of the lengths of the axes having a value with an upper limit of substantially two; the longer axis passing through the centers of two of the teeth; the shorter axis passing through the center of the spaces between other teeth; the pitch line for the teeth being substantially uniformly spaced from the enveloping curve; the said four teeth forming two sets of two teeth, each two teeth in each set being on opposite sides of the shorter axis of symmetry, the center line of each set having a portion adjacent the pitch line that is curved about a point on the line defining said longer axis, said point being located at a distance from the axis of rotation corresponding to half the sum of the length of the longer and shorter axes of the pitch line, the point being on the same side of the shorter axis as the corresponding teeth in the set.

3. In a fluid pressure device, a casing having a pair of internal cylindrical surfaces with spaced parallel axes, as well as an inlet opening and an outlet opening on opposite sides of the plane that passes through the said axes; and a pair of rotors having centers of rotation respectively at the axes of the cylindrical surfaces; each of said rotors having intermeshing teeth; and having the following characteristics: there being two mutually perpendicular axes of symmetry intersecting at the center of rotation of the rotor; there being six substantially uniformly spaced teeth on the rotor; there being a pitch line uniformly spaced from the ends of the teeth; the spaces between the teeth as measured along the pitch line having substantially the same width as the teeth; the curve enveloping the ends of the teeth being such that one axis of symmetry measured at the intersections with said curve is longer than the other axis of symmetry, the ratio of the lengths of the axes of symmetry having a value with an upper limit of substantially two; the longer axis of symmetry passing through the centers of two of the teeth that move into sealing contact with one of said internal cylindrical surfaces; and the shorter axis of symmetry passing through the center of the spaces between other teeth.

4. In a fluid pressure device, a casing having a pair of internal cylindrical surfaces with spaced parallel axes, as well as an inlet opening and an outlet opening on opposite sides of the plane that passes through the said axes; and a pair of rotors having centers of rotation respectively at the axes of the cylindrical surfaces; each of said rotors having intermeshing teeth, and having the following characteristics: there being two mutually perpendicular axes of symmetry intersecting at the center of rotation of the rotor; there being six substantially uniformly spaced teeth on the rotor; the curve enveloping the ends of the teeth being such that one axis of symmetry measured at the intersections with said curve is longer than the other axis of symmetry, the ratio of the lengths of the axes of symmetry having a value with an upper limit of substantially two; the longer axis of symmetry passing through the centers of two of the teeth that move into sealing contact with one of said internal cylindrical surfaces; the shorter axis of symmetry passing through the center of the spaces between other teeth; the pitch line for the teeth being substantially uniformly spaced from the enveloping curve; the said four teeth forming two sets of two teeth, each two teeth in each set being on opposite sides of the shorter axis of symmetry, the center line of each set having a portion adjacent the pitch line that is curved about a point on the line defining said longer axis, said point being located at a distance from the axis of rotation corresponding to half the sum of the length of the longer and shorter axes of the pitch line, the point being on the same side of the shorter axis as the corresponding teeth in the set.

5. In a fluid pressure device, a casing having a pair of internal cylindrical surfaces with spaced parallel axes, as well as an inlet opening and an outlet opening on opposite sides of the plane that passes through the said axes; and a pair of rotors having centers of rotation respectively at the axes of the cylindrical surfaces; each of said rotors having intermeshing teeth, and having the following characteristics: there being two mutually perpendicular axes of symmetry intersecting at the center of rotation of the rotor; there being six substantially uniformly spaced teeth on the rotor; the curve enveloping the ends of the teeth being such that one axis of symmetry measured at the intersections with said curve is longer than the other axis of symmetry, the ratio of the lengths of the axes of symmetry having a value with an upper limit of substantially two, the longer axis of symmetry passing through the centers of two of the teeth that move into sealing contact with one of said internal cylindrical surfaces; the shorter axis of symmetry passing through the center of the spaces between other teeth, the pitch line for the teeth being substantially uniformly spaced from the enveloping curve; the four teeth that do not lie on the longer axis of symmetry being so formed that when the longer axis of symmetry of one rotor is in alignment with the shorter axis of symmetry of the other rotor, a circular arc can be drawn, with its center on the axis of rotation of said other rotor, with a radius approximating that of the internal cylindrical surface of the casing, said arc passing through those two teeth on the one rotor which are adjacent and on opposite sides of the meshing tooth on the long axis of symmetry of the said one rotor, said arc substantially bisecting those portions, defined by the sides of the said two teeth, of lines extending radially from the said center of the other rotor and intersecting said teeth adjacent the pitch line.

FRANCIS W. GUIBERT.
FREDERIC B. FULLER.